June 8, 1965 R. J. FIALA Re. 25,796
REFINING SOYBEAN OIL
Original Filed April 27, 1961
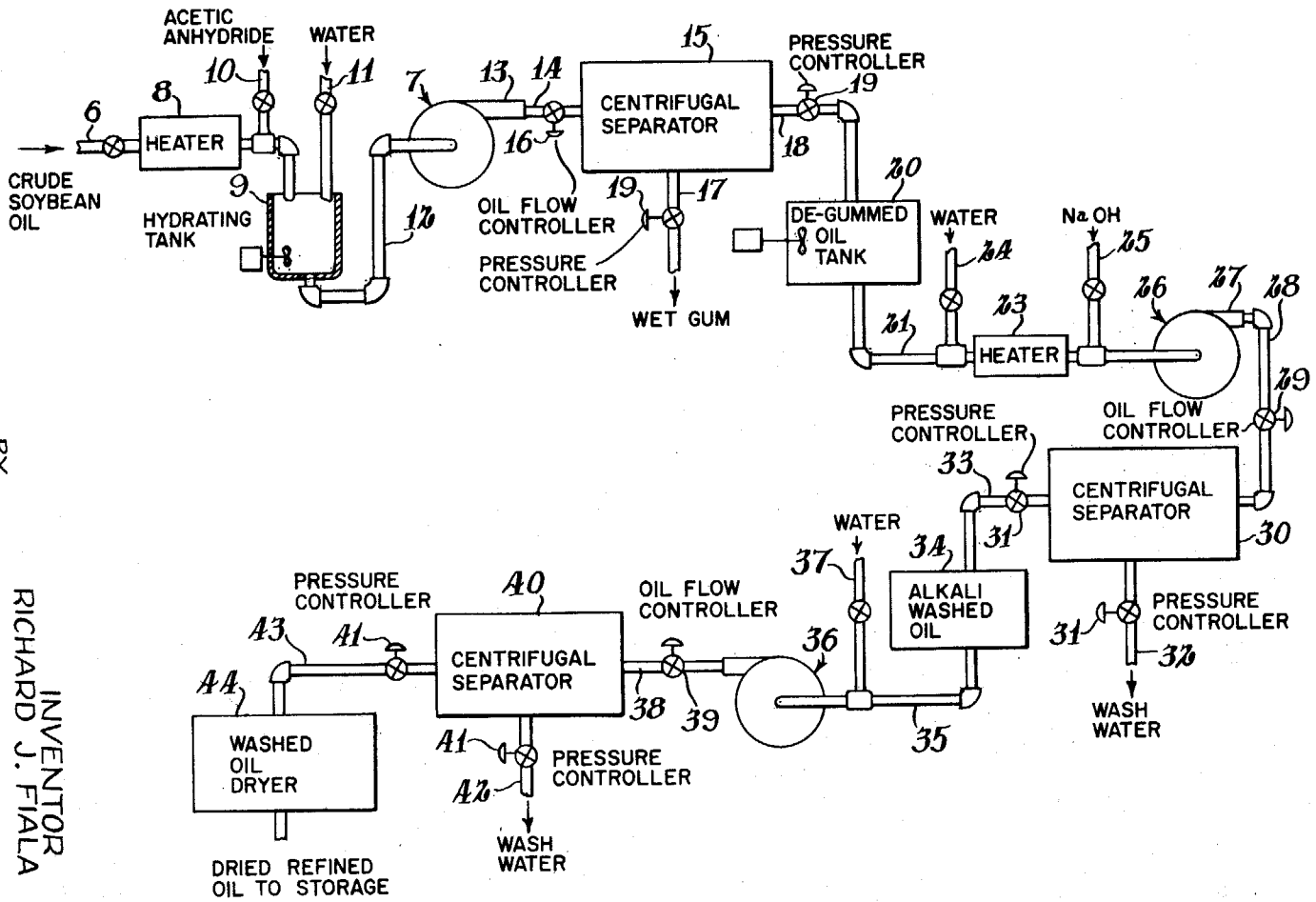
INVENTOR
RICHARD J. FIALA
BY Charles J. Meyerson Atty.

United States Patent Office

Re. 25,79

Reissued June 8, 19

25,796

REFINING SOYBEAN OIL

Richard J. Fiala, Decatur, Ill., assignor to A. E. Staley Manufacturing Company, Decatur, Ill., a corporation of Delaware Original No. 3,093,667, dated June 11, 1963, Ser. No. 106,103, Apr. 27, 1961. Application for reissue Jan. 29, 1964, Ser. No. 353,309

11 Claims. (Cl. 260—424)

Matter enclosed in heavy brackets [ ] appears in the original patent but forms no part of this reissue specification; matter printed in italics indicates the additions made by reissue.

This invention relates, generally, to improvements and innovations in the processing or refining of soybean oil. More particularly, it pertains to innovations and improvements in the washing of soybean oil that has been degummed by the acid anhydride-water degumming treatment disclosed in Patent No. 2,782,216.

Prior to the commercial use of acetic anhydride in the degumming of soybean oil as taught in Patent No. 2,782,-216, crude soybean oil had been treated according to the so-called 'alkali refining" process for the dual purpose of degumming and neutralizing to obtain so-called "break free," neutral soybean oil. Essentially, the alkali refining process consists of treating either crude soybean oil, or soybean oil which has been degummed with plain water, with aqueous caustic solution. The by-product of the alkali refining operation is known as "soap stock" and is a dark, greasy substance consisting mainly of a mixture of soaps, phosphatides, neutral oil and water. If crude (undegummed) oil is alkali refined the soap stock includes all the phosphatides, and all of the free fatty acids *from the oil,* as soap. When oil degummed with plain water is alkali refined, the soap stock will contain approximately 10% of the phosphatides and from about one-half to two-thirds of the free fatty acids as soaps.

The main objection or drawback to the alkali refining technique is the unavoidable loss of valuable neutral oil, partly by entrainment or emulsification of neutral oil in the soap stock and partly by [hydrolysis] *saponification* of [the] neutral oil. As the name implies, soap stock has very little value and is sold as a low priced, low grade, by-product. The so-called acid anhydride degumming process disclosed in Patent No. 2,782,216 was a substantial improvement over the alkali refining process, particularly as applied to soybean oil, for several reasons, the more important being: it permitted break-free soybean oil to be obtained in the degumming operation alone without an additional alkali refining step; fatty acids could be recovered in a single step as once-distilled fatty acids during the deodorization operation; the loss of neutral oil was substantially reduced; and, the deodorized break-free oil had excellent flavor and good stability.

The free fatty acid content of soybean oil, *which has been* degummed according to United States Patent 2,782,-216, ranges from about 0.25 to about 1.5 percent by weight of the oil calculated as oleic acid. Included in this content is residual lower fatty acid, e.g. acetic acid, derived from the degumming anhydride. One thousand pounds of the oil may contain from about 0.009 to about 0.053 pound-equivalents of free fatty acid. The amount of sodium hydroxide required to neutralize the acid ranges from 0.36–2.12 pounds.

Subsequent to the discovery of the acid anhydride degumming process as disclosed in Patent No. 2,782,216, it was discovered that the washing of the thus degummed oil could be improved in the following respects by incorporating in the wash water small quantities of either certain phosphatic washing agents or of tannic acid as disclosed in Patents Nos. 2,881,195 and 2,792,411, respectively: Better separation of the water and oil phases v obtained; the oil losses in washing were decreased; a the washed degummed oils had improved color stabi on heating.

It has now been found in accordance with the pres invention that a number of unexpected improveme and advantages are obtainable by using small amount caustic soda or other alkali metal hydroxide in the wa ing of soybean oil that has been degummed with the us an acid anhydride, e.g. acetic anhydride, as a degumn aid, such caustic soda or other alkali metal hydro being used in lieu of tannic acid or one of the phosph materials as disclosed in the above mentioned Pat 2,792,411 and 2,881,195, respectively.

One of the principal advantages accruing from the of a small amount of caustic soda or other alkali m hydroxide in the washing of soybean oil that has l degummed with acetic anhydride as a degumming occurs in connection with certain crude soybean oils are unusually difficult to degum by the acid anhyc degumming process. When these "difficult-to-degum" beans were processed by the commercial acetic anhyc degumming process, either with or without a washing such as a phosphatic compound (e.g. Calgon) or ta acid, it was found that relatively high levels of p phorus (i.e. over 50 parts per million of phosphorus) left in the degummed oil. These residual phosphorus pounds led to a considerable amount of emulsific of neutral oil, free fatty acid, and wash water in the v washing step. Such emulsification loss of neutral the water wash step increased the wash loss of ne oil from an average of 0.25% to the 0.5 to 3% range, substantially eliminating the improved yields nor obtainable with the acid anhydride degumming pr It was unexpectedly discovered in accordance wit present invention that these wash step emulsions be either completely or substantially eliminated by a small amounts of caustic soda, or other alkali met droxide, to the acid anhydride degummed soybea in the washing step prior to separation of the wash from the oil. It would normally have been expecte postulated that the use of alkali in the washing of "difficult-to-degum" oils would have been of no and probably would make matters worse. Thus, it normally be anticipated that the alkali would reac free fatty acids present to form soaps and that the would tend to emulsify the oil and water, there creasing the emulsification loss of neutral oil. Ho contrary to such expectations, the added sodium h ide does not act in this manner.

Representative data on neutral oil loss due to e fication will further bring out the significance of th ent invention. When normal or "easily degummec bean oils are treated according to the acetic anh degumming process and washed with a phosphatic rial or tannic acid, the average or normal loss *principally* neutral oil, will be about 0.25%. Hc when the same degumming process and washing niques are applied to a "difficult-to-degum" oil th loss of neutral oil in the wash water steeply rises range of 0.5–3%. Hence, the yield benefits attrib the acetic anhydride degumming process disappear processing of these difficult-to-degum oils. Howe using a small amount of caustic soda or other alka hydroxide in the washing operation the losses of oil in the wash water can be kept below 0.75% anc the range of 0.3% to 0.75%—a loss of 0.45% to being typical when the free fatty acid of the crude s oil is in the range 0.4–0.7%.

When the caustic soda is used in place of either phatic material (e.g. Calgon) or tannic acid in th er treatment of a normal or easily degummed soy-
1 oil that has been treated with acetic anhydride,
1 the loss in the washing step is somewhat greater than
would be with one of the phosphatic materials or
ic acid. For example, in such a case, the wash loss
caustic soda will run from 0.3% to 0.75%, whereas,
he average using either Calgon or tannic acid in the
1 water, the loss will be around 0.25%. The primary
ons for this difference is the removal of free fatty
(FFA) in the caustic wash step, the loss of neutral
not being appreciably different. Even though such
of caustic soda results in higher washing losses of free
acids in the washing of acetic anhydride degummed
ean oils that were easily degummed or responded
ally to such treatment, it was found that certain other
ntages resulted from the use of caustic soda in place
phosphatic material or tannic acid. For example,
is a substantial reduction in costs due to reduced
h losses, reduced requirements of bleaching earth,
educed cost of acetic anhydride. Furthermore, from
tandpoint of quality, by reason of using the caustic
in place of the phosphatic material or tannic acid
wash water, the iron content of the oil is significant-
duced, the Lovibond color and the bleachability are
oved, the chlorophyll content is reduced and the free
acid content is lower.

should also be mentioned that with difficult-to-degum
an oils, the increased loss of neutral oil experi-
in employing the commercial acetic anhydride de-
ning process was only one difficulty that was noted.
ldition it was found that the bleaching earth re-
nents were greatly increased, and there was an in-
d tendency toward color reversion. Each of these
ems, as well as the increase in loss of neutral oil,
eliminated or substantially overcome by the use
ustic wash step following the degumming with
anhydride.

cordingly, while the present invention has special
in connection with the degumming of soybean oils
re difficult to degum with acetic anhydride, the
ion also has utility and advantages in connection
he washing of normal or easily degummed soybean
explained above.

object of this invention, generally stated, is the
vement in washing soybean oil degummed with the
acid anhydride which resides in incorporating a
amount of caustic soda or the like during the wash-
the degummed oil thereby substantially lowering
ss of neutral oil due to emulsification.

rther object of the present invention is the use of
soda or other alkali metal hydroxide in a small
t in the washing of soybean oil that has been de-
d with the use of acetic anhydride so as to reduce
n content of the degummed oil, improve the Lovi-
olor and bleachability, reduce the chlorophyll and
tty acid contents, and reduce the use of bleaching
nd acetic anhydride required.

ain other objects of the invention will, in part, be
s and will in part appear hereinafter.

a more complete understanding of the nature and
of the invention reference may now be had to
llowing detailed description thereof wherein an
tive example is set forth in connection with the
eet contained in the accompanying drawing.

general embodiment or procedure for practicing
ention will be described in connection with the
anying drawing, following which a specific work-
mple will be given.

ring to the drawing, crude soybean oil is fed
line 6 containing a heat exchanger 8 for adjust-
temperature of the crude oil to that which is es-
d for best treating conditions before it is delivered
hydrating tank 9 equipper with a power stirrer.
anhydride (or other selected acid anhydride) is
d into line 6 through a line 10 from a suitable supply. Water is introduced as needed into the tank 9 through water line 11. The oil-water mix is retained in the hydration tank 9 where a minimum 15-minute contact period is established. The oil-water mixture in this tank is agitated to prevent the hydrated gums from falling out. The oil-water mixture is then fed through line 12 to the suction side of a centrifugal pump 7. The discharge connection 13 of the pump 7 communicates through a line 14 to the feed or inlet connection of a known type continuous centrifugal separator designated at 15. There are several well known centrifugal separators available in this country that may be used, e.g. the Podbielniak, De Laval and Westphalia continuous separators or centrifuges. An automatic flow controller 16 of known type is provided in line 14 for regulating the flow rate into the separator 15 at a predetermined value.

In the continuous centrifuge 15 the aqueous phase is separated from the degummed oil and discharged through line 17 as so-called "wet gums," while degummed oil discharges through line 18 into a stirrer-equipped, degummed oil tank 20. The lines 17 and 18 are provided with pressure regulators 19 of known type which automatically control the operation of the separator 15 in conjunction with the automatic flow controller 16. The degummed oil tank 20 is connected with a discharge line 21 which communicates with a second centrifugal pump 26. The line 21 is provided with a heat exchanger 23 and lines 24 and 25 for supplying water and caustic soda solution, respectively, to the line 21. The discharge connection 27 of the pump 26 is connected by way of line 28 containing an automatic flow controller 29 to the inlet connection of a second continuous centrifugal separator indicated at 30. In the centrifuge 30 the degummed oil washed with caustic soda solution is separated into oil and aqueous phases, with the waste wash water being discharged from the centrifuge through line 32 while the alkali washed oil is discharged through line 33 into an alkali washed oil receiving tank [35] *34*. Lines 32 and 33 are equipped wtih automatic pressure regulators 31 which automatically control the operation of the separator 30 in conjunction with the flow controller 29.

The caustic washed oil is drawn from the tank 34 through the line 35 into the inlet connection of a pump 36 with fresh wash water being added through line 37. The pump 36 discharges the oil and water mixture through line 38 equipped with automatic flow controller 39 into a third continuous centrifuge 40. The wash water from the centrifuge 40 is discharged through line 42 while the washed oil is discharged through line 43 to a [storage tank 44] *dryer 44 where the degummed, washed oil is dried and then discharged to storage.* Lines 42 and 43 are both provided with automatic pressure controllers 41.

As indicated in the drawing, the flow lines 6, 10, 11, 24, 25 and 37 are provided with suitable valves in order that flow therethrough may be regulated or entirely closed off, as desired.

The following example will serve to disclose one specific procedure by which the present invention may be practiced utilizing the equipment described above in connection with the drawing.

EXAMPLE 1

"Crude soybean oil that was found to be difficult-to-degum" by the commerical verison of the acid anhydric process described in Patents 2,792,411 and 2,881,195 is introduced into line 6 at the rate of 72 gallons per minute. On passing through the heater 8 the temperature of the crude oil is raised to about 140° F. Acetic anhydride is introduced from line 10 into the stream of crude oil at the rate of 0.65 lb. per minute which equals 0.12% by weight of the crude oil flow. Water is added to the stream of crude oil from pipe [12] *11* at the rate of 1.3–1.9 gallons per minute which equals 2–3% by weight of the crude oil. The pump 7 is operated to give a discharge pressure of approximately 140 pounds per square inch gauge.

The centrifugal separator 15 operates to continuously [form] *separate* and discharge a stream of wet gums through the discharge line 17 and another stream of the degummed oil through line 18 which is delivered into the tank 20 from which it is being continually withdrawn through line 21. The oil pressure to the centrifuge is maintained at 140 p.s.i.g. by opening or closing the pressure controller 19 in line 17. The oil pressure from the centrifuge is maintained at 100 p.s.i.g. by opening or closing the pressure controller 19 in line 18. The degummed oil will discharge through the line 18 at the rate of approximately 70 gallons per minute when the crude oil is being fed at the above mentioned rate.

The degummed oil is withdrawn from the tank 20 through line 21 at a rate sufficient to balance the rate of discharge from the separator 15. A heater 23 is disposed in line 21 and lines 24 and 25 are connected therewith to supply water and caustic solution respectively. In heater 23 the degummed oil is heated to a temperature of about 180° F. Line 21 is connected with the inlet of a centrifugal pump 26 the discharge connection 27 of which is connected with a line 28 leading to the inlet connection of a centrifugal separator 30.

Sodium hydroxide or caustic soda solution of 12.5 Baumé at 100° F. is added through the line 25 at a rate equal to 130% of the amount required to completely neutralize the free fatty acid content of the oil. The free fatty acid content of the oil in tank 20 is determined periodically and the additon of caustic soda adjusted accordingly in known manner. For example, with the flow conditions above mentioned a typical rate of additon of 12.5 Baumé caustic would be 4.3 lbs. per minute. Water is added through line 24 at a rate equal to 3–3.5% by weight of the degummed oil, *i.e. sufficient to prevent separation of this stream into two phases.*

The pump 26 feeds the degummed oil stream containing the added water and caustic soda into the separator 30 at a pressure of 70 p.s.i.g. and a separation is continuously effected therein so as to discharge an aqueous wash water phase through line 32 and an alkali washed oil stream through line 23 leading into tank 34. The oil pressure into the separator 30 is maintained at 70 p.s.i.g. by regulating the pressure controller 31 in line 32. The oil pressure from separator 30 is maintained at 55 p.s.i.g. by regulating the pressure controller 31 in line 33.

The alkali washed oil is withdrawn from tank 34 by way of line 35 which connects with the inlet connection of a third centrifugal pump 36. Fresh wash water is added to the oil stream through the line 37 in a proportion equal to 6% by weight of the alkali washed oil. In the separator 40 the oil and aqueous phases are again separated with the washed degummed oil being discharged through line 43 into the [hold tank 44] *dryer 44* and the aqueous wash water phase being discharged through line 42. The oil pressure into separator 40 is maintained at 70 p.s.i.g. by regulating the pressure controller 41 in line 42, while the oil pressure from the separator 40 is maintained at 55 p.s.i.g. by regulating the pressure controller 41 in line 43.

The washed oil [from tank 44] may be [withdrawn and spray] dried *in dryer 44* thereby giving a finished break-free soybean oil.

The following are among the modifications or changes which may be made in carrying out Example 1 as described above:

(a) The crude oil may be heated in heater 8 to a temperature in the range of 120 to 200° F.

(b) Acetic anhydride may be added through line 10 to the crude oil in a proportion within the range of 0.05 to 0.25% by weight, and as taught in Patent 2,782,216, the acetic anhydride may be replaced, in whole or in part, with equal stoichiometric quantities of one or more lower alkyl monobasic or dibasic acid anhydrides selected from the group consisting of propionic anyhdride, butyric anhydride, maleic anhydride, succinic anhydride, monomethyl succinic acid anhydride, and dimethyl succin acid anhydride.

(c) The amount of water addition through line 11 ma range between 1 to 4% by weight of the crude oil depen ing upon the break content of the crude oil.

(d) The addition streams of water 24 and alkali may be reversed or combined, and the water stream ma be added to tank 20.

(e) The combined rates of water and alkali additio through lines 24 and 25, respectively, may range fro about 2% to about 10% by weight of the oil. The ra of water addition through line 37 may range from abo 3% to about 10% by weight of the oil.

(f) The rate of addition of caustic soda, or other alk metal hydroxide such as potassium hydroxide, throu line 25 may be in the range of 20% to 200% of the the retical amount required to neutralize the free fatty acids the oil. However, the preferred range is 125–130%, i 1.25–1.30 of the theoretical requirement. When co plete neutralization of the free fatty acids is desired, th it is preferred to use about 130% of the theoretical quirements of caustic. However, when such compl neutralization is not required, it has been found that of about 40 to 60% of the theoretical requirement of ca tic will result in the minimum total loss (i.e. free fa acids plus neutral oil) in the washing step. If sodi hydroxide is the washing alkali, its rate of addition the degummed oil, expressed as pounds of dry substa sodium hydroxide per minute, may range from ab 0.035 to about 2.12.

(g) The concentration of alkali in the combined total alkali wash water should not exceed about 1.5 r mal or about 6% by weight as sodium hydroxide. If minmum alkali as sodium hydroxide is used (0.04 po per 72 gallons or 500 pounds of soybean oil), and dissolved in the maximum proportion of wash water pounds, i.e., 10% by weight of the oil), the concer tion of sodium hydroxide in the wash water is 0.08% weight. Alkali concentrations above 1.5 normal in wash water are to be avoided because they lead to und able separation of soaps as [a] separate [phase] *ph* The soap phase thus obtained interferes with the sm operation of centrifugal separator 30. The prefe range of alkali concentration in the total wash wat about 0.25 to 0.75 normal.

(h) The temperature range within which the a wash step may be carried out can range between 16( to 200° F. with the oil being heated in that range on sage through the heater 23.

The invention may also be practiced in a batch pr as illustrated by the following example.

EXAMPLE 2

6000 pounds of crude soybean oil such as that us Example 1, confined in a cone-bottom tank equi with an efficient mechanical agitator, steam heating and a draw-off line attached to the point of the cone tom, is warmed to 40° C. To the stirred warm quickly added six pounds of acetic anhydride and sti is continued for ten minutes. With continued sti 90 pounds of water is quickly added to the mi: Stirring is continued for 30 minutes thereafter, d which time the temperature of the mixture is grac raised to 65° C. The agitator is then shut off an mixture allowed to stand quietly until maximum se tion of oil and water phases occurs. This requires eight hours. The bottom water phase, or gum, is fully separated from upper oil phase by means c draw-off line. Two hundred pounds of alkaline water containing 4 pounds dry substance basis of s hydroxide equivalent to 130% of the free fatty ac the degummed oil are added to the oil. The mixt stirred for 15 minutes, during which time it is again to 65° C. The wash water is separated fro oil by stopping the agitator, letting the mixture til the two liquid phases separate cleanly, and draw- ; off the lower wash water phase through the cone ttom draw-off line. No emulsification occurs during s washing step, and the phases separate satisfactorily er the mixture stands quietly for eight hours. The ne washing operation is repeated, omitting the addition sodium hydroxide to the wash water. The final shed oil is break free.

In the light of the foregoing disclosure those skilled in art will be able to practice the invention either ac- ding to the specific embodiments and directions set th above, or according to other embodiments which l be obvious. Accordingly, the foregoing disclosure ntended to be interpreted as illustrated and not in a iting sense.

What is claimed as new is:

. In the processing of soybean oil wherein the crude is first degummed with water, *the oil* containing a ll amount of at least one acid anhydride selected n the group consisting of lower alkyl aliphatic mono- ic and dibasic acid anhydrides as a degumming aid, t the wet gums are separated from the oil, and then degummed oil is washed, the improvement in the hing operation which comprises, washing the degum- l oil *with water* without any intervening treatment in a non-attenuated condition with from about 50% 00% by weight of the alkali metal hydroxide required eutralize the free fatty acid content of the degummed . In the processing of soybean oil wherein the crude s first [water] degummed with water, *the oil* con- ing a small amount of acetic anhydride as a degum- g aid, next the wet gums are separated from the oil, then the degummed oil is washed, the improvement e washing operation which comprises, washing the mmed oil *with water* without any intervening treat- t and in a non-attenuated condition in the presence bout 50% to 200% by weight of the alkali metal oxide required to neutralize the free fatty acid content e degummed oil.

In the processing of soybean oil wherein the crude s first [water] degummed with water, *the oil* con- ng a small amount of acetic anhydride as a degum- ; aid, next the wet gums are separated from the oil, then the degummed oil is washed, the improvement e washing operation which comprises, washing the mmed oil *with water* without any intervening treatment and in a non-attenuated condition in the presence of about 50% to 200% by weight of the sodium hydroxide required to neutralize the free fatty acid content of the degummed oil.

4. In the processing of soybean oil wherein the crude oil is first [water] degumed with water, *the oil* containing a small amount of acetic anhydride as a degumming aid, next the wet gums are separated from the oil, and then the degummed oil is washed, the improvement in the washing operation which comprises, washing the degummed oil *with water* without any intervening treatment and in a non-attenuated condition in the presence of about 125% to 130% of the sodium hydroxide required to neutralize the free fatty acid content of the degummed oil.

5. The improvement of claim 3 wherein the degummed oil is contacted with an aqueous solution containing from about 1% to 3% by weight of alkali.

6. The improvement of claim 4 wherein the degummed oil is contacted with an aqueous solution containing from about 1% to 3% by weight of alkali.

7. The improvement of claim 3 wherein said washing is conducted at a temperature in the range of about 160 to 200° F.

8. The improvement of claim 3 wherein said washing is conducted at a temperature of at least about 180° F.

9. The improvement of claim 4 wherein said washing is conducted at a temperature in the range of about 160 to 200° F.

10. The improvement of claim 4 wherein said washing is conducted at a temperature of at least about 180° F.

11. The improvement of claim 3 wherein after said washing with sodium hydroxide the aqueous phase is separated from the oil phase, and the resulting alkali-washed oil is washed at least once with plain water.

References Cited by the Examiner

The following references, cited by the Examiner, are of record in the patented file of this patent or the original patent.

UNITED STATES PATENTS

| | | | |
|---|---|---|---|
| 2,337,041 | 12/43 | Giles et al. | 260—425 |
| 2,666,074 | 1/54 | Sadler | 260—424 |
| 2,782,216 | 2/57 | Hayes et al. | 260—424 |

CHARLES B. PARKER, *Primary Examiner.*